Feb. 21, 1939. N. AHLMANN 2,148,052
PROCESS AND APPARATUS FOR BURNING CEMENT AND SIMILAR MATERIALS
Filed Feb. 19, 1938
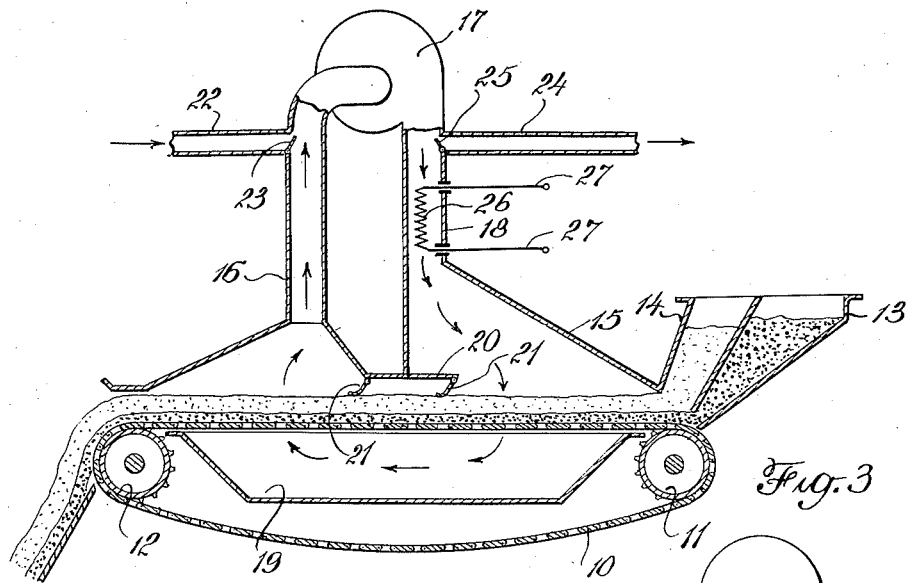
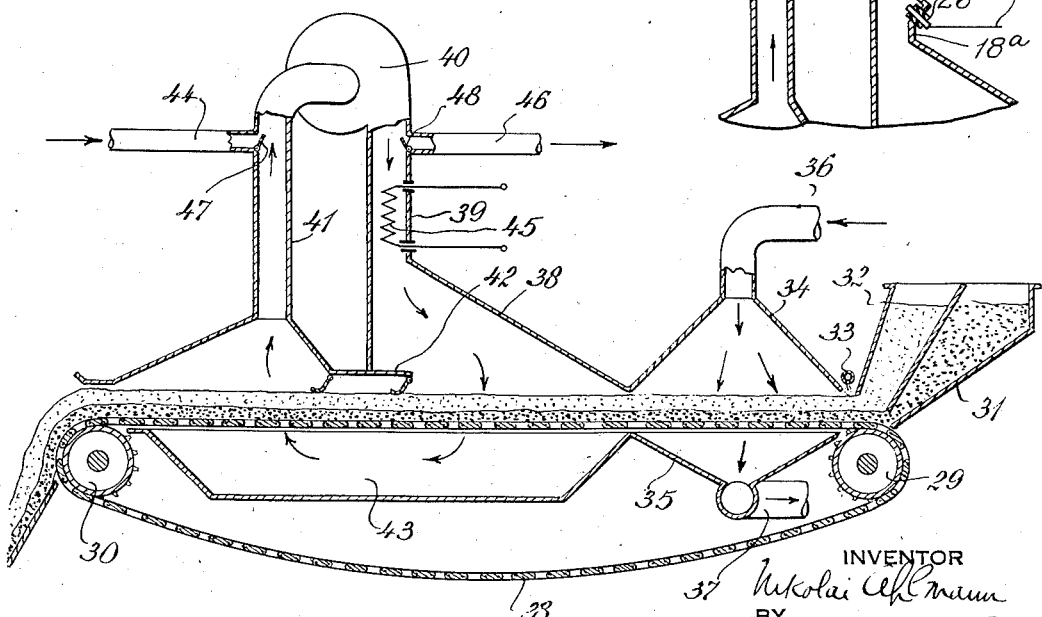

Patented Feb. 21, 1939

2,148,052

UNITED STATES PATENT OFFICE 2,148,052

PROCESS AND APPARATUS FOR BURNING CEMENT AND SIMILAR MATERIALS

Nikolai Ahlmann, Copenhagen, Denmark, assignor to F. L. Smidth & Company, New York, N. Y., a corporation of New Jersey Application February 19, 1938, Serial No. 191,368
In Great Britain March 11, 1937

16 Claims. (Cl. 263—28)

This invention relates to the sintering or burning of raw materials which require large quantities of heat for such treatment. More particularly, the invention is concerned with a novel method of sintering or burning in which the materials are so treated while resting on a gaspervious support, and with novel apparatus by which the method can be advantageously practiced. The principles of the invention may be utilized with improved results in the burning or sintering of raw materials of various kinds, but, since the new method and apparatus are especially suited for use in the production of clinker from cement raw materials, an embodiment of the invention for that purpose will be illustrated and described in detail by way of explanation. It is to be understood, however, that the utility of the invention is not limited to that particular field.

Attempts have been made heretofore to burn cement raw materials and the like on a pervious support, such as a travelling grate, and one method proposed for this purpose involves mixing the raw materials with powdered fuel, depositing the mixture in a layer on the grate, igniting the fuel, and passing combustion supporting gases through the layer to cause the fuel to be consumed. In a second such method, the materials to be treated are deposited upon a pervious support without admixture of fuel, and the sintering is effected by hot gases passed therethrough. In these and similar methods, the materials undergoing treatment are relatively coarse or in the form of nodules or briquettes and the temperatures developed and required are very high. In such operations, even uniform application of the heat to the materials is difficult, and as a result, the materials are not uniformly burned, and it is not unusual to find that fusion has taken place in some parts of the layer, while in others, the materials have not been sufficiently heated to produce complete calcination thereof.

The present invention is accordingly directed to the provision of a method by which sintering or burning of cement and similar raw materials may be accomplished with improved results, the operation being carried on under such control that overburning and underburning are substantially avoided. In addition, the heat losses are cut down so that substantial economies in fuel consumption are made possible.

In the practice of the new method, the materials in fine grained condition are deposited in a layer upon a pervious support, such, for example, as a travelling grate passing through a chamber, and within the chamber, a circulating flow of gases is maintained in such manner that the gases pass through the layer at one place and return to their starting point, preferably by passage through the layer at another place. The gases passing initially through the layer are at a temperature substantially that at which sintering of the raw materials takes place, and the gases are maintained at this temperature in various ways. Thus, the hot gases may be derived from a source of supply, such as a furnace, and continuously introduced into the chamber, in which event, the temperature of the gases in their first passage through the materials is controlled in any suitable way, as by regulating the amount of the hot gases introduced and by continuous withdrawal of a portion of the circulating stream. Instead of this procedure, the temperature of the gases may be maintained by heat derived from a heating device, such as an electrical resistor or arc, or a part of the gases or mixture may be so heated.

The method of the invention involves numerous novel features and variations, and its practice will be better understood by reference to the accompanying drawing, in which Figure 1 is a view in vertical section, with parts shown in elevation, of an apparatus for practicing one form of the method of the invention;

Figure 2 is a similar view showing the apparatus adapted for practice of a modified form of the new method; and Fig. 3 is a fragmentary view similar to Figure 1 showing a modified form of heating device.

The apparatus shown in Figure 1 includes an endless pervious support 10 which may be of any suitable construction and is illustrated as being a chain grate passed around rollers 11 and 12, one or both of which may be driven. Adjacent the roller 11 are hoppers 13 and 14 by which materials may be distributed on the upper stretch of the grate to form a composite layer. From the hopper 13, a layer of heat resistant material, such as cement clinker, is deposited in direct contact with the grate and the raw materials to be burned are deposited from the hopper 14 upon the layer of clinker. The layer of clinker in contact with the grate serves as a means for protecting the latter from hot gases which have passed through the layer of raw material.

The upper stretch of the grate lies within a hood or chamber 15 having an outlet conduit 16 leading to a fan 17, and the discharge from the fan is connected to an inlet conduit 18 leading into the chamber at the side near the hoppers. Beneath the upper stretch of the grate is a second chamber 19, the arrangement shown being such that gases flowing into the chamber 15 pass down through the layer of material entering the chamber on the grate, flow through the chamber 19, and then pass up through the layer a second time to the outlet conduit 16 which leads them to the fan. At the lower end of the conduits is a sealing device 20 of any suitable construction, the device shown including a pair of sealing members 21 which lie in contact with the layer of material on the grate and prevent short circuiting of the gases from the inlet to the outlet sides of the chamber 15.

Connected with the outlet conduit 16 is a conduit 22 by which hot gases from a source of supply are introduced into the apparatus, the amount of the gases admitted being controlled by a damper 23 at the discharge end of the conduit 22. Connected to a conduit 18 is an outlet conduit 24 through which a portion of the gases within the apparatus may be discharged, the amount of the discharge being controlled by a damper 25 at the inlet end of conduit 18. Within the conduit 18 is a heating device 26, here shown as an electrical resistance unit supplied with power through leads 27, although various other heating devices, such as an electric arc, may be used, if preferred.

A form of the apparatus employing an electric arc as the means for heating the gases is shown in Figure 3. This apparatus is similar to that shown in Figure 1 in all respects except that electrodes 26ª are mounted in the wall of the conduit 18ª and to them are connected the lines 27ª. The ends of the electrodes lie in the stream of gases flowing through conduit 18ª so that the arc between the electrodes heats the gases.

In the operation of the apparatus shown in Figures 1 and 3, the material to be burned or sintered is deposited in the form of a layer on top of the layer of clinker or heat resistant material protecting the grate, and is moved through the chamber 15 as the grate travels alone. During such movement, the material is first calcined in the region of the chamber close to the hoppers, and as the heating continues, sintering or burning is effected. The gases employed may be derived from any suitable source, as, for example, from a furnace, or, if preferred, the heat required may be furnished by the heating device 26 or the arc between electrodes 26ª. The gases which pass down through the layer of raw materials are at a temperature aproximating that at which the materials sinter, and the temperature lies between 1400° C. and 1500° C., and is preferably about 1450° C. After travelling through the layer of material and giving up heat thereto, the gases flow through the layer to be mixed with the incoming gases, so that the temperature of the stream will again be raised to that desired, or else the gases flow past the heater to be reheated. In either case, the circulation of the gases effects an important heat economy.

If the temperature of the circulating gases is maintained by addition of hot gases thereto, or if the materials being treated are such as to evolve gas upon heating, a portion of the stream must be withdrawn continuously and is led away in controlled amounts through the conduit 24. If the materials are cement raw materials, a heating device is used, and no additions to the stream are made, the stream soon becomes highly enriched in carbon dioxide by evolution thereof from the materials, and the portion of the stream withdrawn can be used in the production of carbon dioxide snow or dry ice.

In a modified form of the invention, the raw materials are heated and may be partly or wholly calcined in a preliminary operation which may be carried on by mixing with the raw materials an amount of fuel which is sufficient to produce the preheating desired. In this operation, which is preferably carried on in a chamber separate from the sintering chamber, the fuel in the layer is ignited and air is drawn through the porous layer to supply the oxygen necessary for combustion. When the preheating has been accomplished, the material, without intervening cooling, is subjected to the burning or sintering operation by the circulating stream of hot gases heated to the sintering temperature.

One form of the apparatus for the practice of the modified method of the invention is illustrated in Figure 2, and this apparatus includes a pervious support 28 in the form of a chain grate or the like, trained about rollers 29, 30. The grate passes beneath a pair of hoppers disposed close to the roller 29 and from the hopper 31 a layer of heat resistant material is deposited upon the grate. The hopper 32 contains a mixture of the raw materials, together with a quantity of fuel sufficient for the preliminary heating, and a layer of this mixture is deposited from the hopper on top of the heat resistant layer. Just beyond the hoppers, the grate carries the material beneath a burner 33 by which the fuel is ignited and the layer is then passed into a chamber formed by a hood 34 lying above the support, and a second hood 35 lying beneath it. A conduit 36 for air leads to the hood 34 and a discharge conduit 37 for the products of combustion is connected to the hood 35, the air being caused to flow through the layer by a suitable blower or fan. Within the chamber formed by the hoods 34, 35, the fuel is substantially completely consumed, and the raw materials are thus subjected to a preheating operation which, in the case of cement raw materials, may include part or all of the calcination.

From the hoods 34, 35, the material is carried on the support into a chamber 38 lying above the layer and provided with an inlet conduit 39 leading from a fan 40. The inlet of the fan is connected to an outlet conduit 41 from the chamber 38 and a sealing device 42 within the chamber prevents short circuiting of the gas stream. The gases flowing into the chamber through the conduit 39 pass down through the layer on the support and into a chamber 43 whence they pass upwardly through the layer and through the outlet conduit 41 to the fan. The temperature of the gases in the circulating stream is maintained either by introduction of hot gases through a supply conduit 44 connected to the conduit 41 or by means of a heating device 45, such as an electrical resistance unit, although both or other expedients may be employed, if desired, for maintaining the gases at the desired temperature. A portion of the circulating stream may be withdrawn, if required, through an outlet conduit 46 connected to the conduit 39 and the flow into the circulating stream and the discharge from the stream are controlled, respectively, by dampers 47, 48.

The practice of the modified form of the method of the invention by means of the apparatus illustrated in Figure 2 will be apparent from the foregoing. Since the method involves combustion of fuel within the layer of materials, that operation is preferably carried on in a separate chamber so that the products of combustion will not mix with the circulating stream. Then, if the preheating is not such as to complete the calcination, the carbon dioxide evolved in the case of cement raw materials will enter the circulating stream in the chambers 38, 43, and may be recovered.

In both forms of the invention described, the raw materials treated are fine grained, and the speed of flow of the gases is so correlated with the speed of travel of the grate that all particles in the layer, in their passage from the outlet of the supply hopper to the sealing device, are completely sintered. In the event that no preliminary heating operation is carried on, the particles are initially calcined before the sintering takes place. After passing beyond the seal, the materials give up heat to the gases so that the layer itself is cooled. As the temperature of the circulating gas stream can be closely controlled so that it is approximately that of the burning or sintering temperature of the materials, overburning or underburning is practically avoided. A product is thus produced which is substantially uniform, and because of the circulation of the gases, heat losses are greatly reduced. Substantial economies are, therefore, made available and, in the case of cement raw materials, carbon dioxide is recovered in a sufficiently pure form to permit its use in the production of dry ice.

I claim:

1. A method of sintering raw materials which comprises depositing a layer of the ground materials upon a gas-pervious support, maintaining a flow of hot gases in a circuit which passes through the layer at spaced points, continuously mixing hot gases with those in circuit to produce a mixture having a temperature substantially that at which the materials are sintered, and continuously withdrawing from the circulating gases a quantity equal to that added.

2. A method of sintering raw materials which comprises depositing a layer of the ground materials upon a gas-pervious support, passing gases through the layer, the gases being substantially at the sintering temperature of the materials, mixing with the gases, after their passage through the layer, gases of higher temperature to produce a mixture of said sintering temperature, passing the mixture through the layer, and continuing the passing of the gases through the layer and the mixing operations until sintering of the materials is completed.

3. A method of sintering raw materials which comprises depositing a layer of the ground materials upon a gas-pervious support, passing gases through the layer, said gases being substantially at the sintering temperature of the materials, mixing with the gases, after their passage through the layer, gases of higher temperature to produce a mixture at said sintering temperature, continuously withdrawing from the mixture a portion equal to the quantity of hot gases added, and continuing the passing, mixing, and withdrawing operations until the sintering of the materials is completed.

4. A method of treating raw materials which comprises depositing a layer of the ground materials mixed with fuel upon a gas-pervious support, igniting the fuel, passing combustion supporting gas through the layer to effect combustion of the fuel, and thereafter passing gases at the sintering temperature of the materials through the layer in a circulating stream, and increasing the temperature of the circulating stream to the sintering temperature between successive passages of the stream through the layer.

5. A method of treating raw materials which comprises depositing a layer of the ground materials mixed with fuel upon a gas-pervious support, igniting the fuel, passing combustion supporting gas through the layer to effect combustion of the fuel, and thereafter and without intervening cooling, transferring the layer into the path of a circulating stream of hot gases to cause the stream at least one point in its circuit to pass through the layer, and increasing the temperature of the stream to the sintering temperature of the materials between successive passages of the stream through the layer.

6. A method of sintering raw materials which comprises continuously depositing ground raw materials upon a traveling gas-pervious support to form a layer thereon, heating the materials in the layer by passing gases transversely through the layer and support, the gases being at a temperature sufficient to initiate a sintering reaction in the materials, and preparing the gases for their treatment of the materials by passing the gases transversely through the layer and support at a place where sintering is substantially complete so that the gases may take up heat from the materials and adding heat from an external source to the gases to complete the raising of their temperature to the desired value.

7. A method of sintering raw materials which comprises continuously depositing ground raw materials upon a traveling gas-pervious support to form a layer thereon, heating the materials in the layer by passing gases transversely through the layer and support at a place near that where formation of the layer takes place, the gases being at a temperature sufficient to initiate a sintering reaction in the materials, and preparing the gases for the treatment of the materials by passing the gases transversely through the layer and support at a place a substantial distance along the path of travel of the support from the place where the layer was formed, the gases taking up heat from the materials, and adding heat from an external source to the gases to complete the raising of their temperature to the desired value.

8. A method of sintering raw materials which comprises continuously depositing ground raw materials upon a traveling gas-pervious support to form a layer thereon, heating the materials in the layer by passing gases transversely through the layer and support, the gases being at a temperature sufficient to initiate a sintering reaction in the materials, and preparing the gases for their treatment of the materials by passing the gases transversely through the layer and support at a place where sintering is substantially complete so that the gases may take up heat from the materials and mixing gases of a higher temperature with said gases to produce gases of the desire temperature for initiating sintering.

9. A method of sintering raw materials which comprises continuously depositing ground raw materials upon a traveling gas-pervious support to form a layer thereon, heating the materials in the layer by passing gases transversely through the layer and support, the gases being at a temperature sufficient to initiate a sintering reaction in the materials, and preparing the gases for their treatment of the materials by passing the gases transversely through the layer and support at a place where sintering is substantialy complete so that the gases may take up heat from the materials and heating the gases electrically to raise their temperature to the desired value.

10. A method of sintering raw materials which comprises continuously depositing the ground materials upon a traveling gas-pervious support to form a layer thereon, passing hot gases transversely through the layer and support, the gases having a temperature sufficient to initiate the sintering reaction, collecting the gases after their passage through the layer and support, passing the gases transversely through the layer and support at a place where the sintering reaction is substantially complete to permit the gases to take up heat from the materials, and returning the gases after their second passage through the layer and support to the place where they passed through the layer and support the first time.

11. A method of sintering raw materials which comprises depositing the ground materials in a layer upon a gas-pervious support, maintaining a flow of gases along a path which passes transversely through the layer and support at two places spaced apart, the gases taking up heat from sintered materials in the layer in one passage through the layer and support and giving up heat to the materials to initiate sintering thereof in their other passage through the layer and support, and increasing the temperature of the gas stream substantially to the sintering temperature of the materials after the passage in which the stream takes up heat from the materials and before the passage in which the stream gives up heat to the materials.

12. A method of sintering raw materials which comprises depositing the ground materials in a layer upon a gas-pervious support, maintaining a flow of gases along a closed path which passes transversely through the layer and support at two places spaced apart, the gas stream taking up heat from sintered materials in one passage and giving up heat to the materials to initiate sintering thereof in the other passage, and increasing the temperature of the gas stream substantialy to the sintering temperature of the materials after the passage of the stream in which it takes up heat from the materials and before the passage of the stream in which it gives up heat to the materials.

13. A method of sintering raw materials which give off carbon dioxide in the sintering reaction which comprises depositing the ground materials in a layer upon a gas-pervious support, maintaining a flow of gases along a closed path which passes transversely through the layer and support at two places spaced apart, the gas stream taking up heat from the sintered materials in one passage therethrough and giving up heat to the materials to initiate sintering thereof in the other passage, imparting heat to the gas stream to raise the stream substantially to the sintering temperature of the materials after the passage of the stream in which it takes up heat from the materials and before the passage of the stream in which it gives up heat to the materials, and continuously withdrawing from the stream a portion thereof equal to the quantity of gases evolved from the materials undergoing treatment.

14. Apparatus for the heat treatment of raw materials which comprises a traveling gas-pervious support, means for continuously depositing the ground materials upon the support to form a layer thereon, means for maintaining a flow of gases which passes transversely through the layer and support at spaced points, the gases flowing first through the treated materials to take up heat therefrom and then through the materials to give up heat thereto and effect treatment thereof, and means for increasing the temperature of the gases to the desired treating temperature after the passage through the materials in which the gases take up heat from the materials and before the passage in which the gases give up heat to the materials.

15. Apparatus for the heat treatment of raw materials which comprises a traveling gas-pervious support, means for continuously depositing the ground materials upon the support to form a layer thereon, means for maintaining a flow of gases in a closed circuit in which the gas stream passes transversely through the layer and support at spaced points, the gases flowing through the treated materials to take up heat therefrom and then through the untreated materials to effect treatment thereof by giving up heat thereto, means for adding hotter gases to the stream after it has taken up heat from the materials and before it has given up heat thereto, the addition of hotter gases raising the temperature of the stream to the desired treating temperature, and means for removing from the stream a quantity of gases equal to the quantity of hotter gases added.

16. Apparatus for the heat treatment of raw materials which comprises a traveling gas-pervious support, means for depositing upon the support a layer of a mixture of the materials and fuel, means for igniting the fuel in the layer, means for passing combustion supporting gas transversely through the layer and support near the point of ignition of the fuel, means for maintaining a flow of gases in a closed path, the gas stream passing transversely through the layer and support at spaced points beyond the place where the combustion supporting gas passes through the layer and support, the stream taking heat from the materials in one passage therethrough and giving up heat to the materials in its other passage therethrough, and means for increasing the temperature of the gas stream to the desired treating temperature after the passage in which the stream takes up heat from the materials and before the passage in which the stream gives up heat to the materials.

NIKOLAI AHLMANN.